Figure 1:
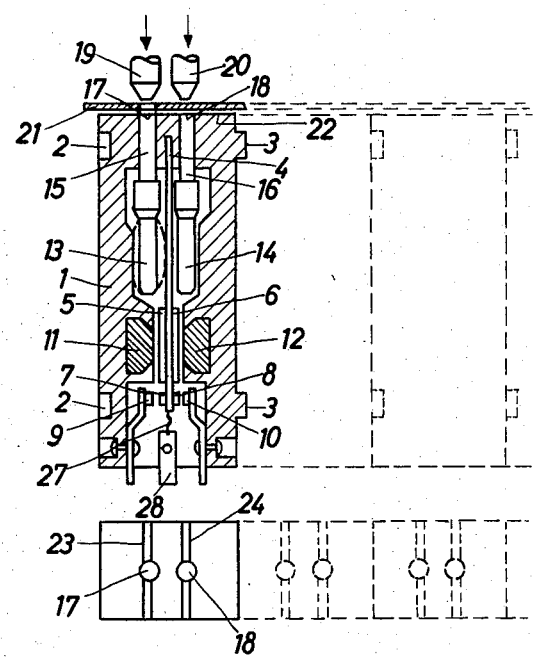

Sept. 20, 1960     R. BAUDER     2,953,654
CONTROL ARRANGEMENT INCLUDING A PUNCHED PROGRAM CARRIER
Filed Dec. 16, 1958

INVENTOR:
REINHOLD BAUDER

United States Patent Office 2,953,654
Patented Sept. 20, 1960

2,953,654
CONTROL ARRANGEMENT INCLUDING A PUNCHED PROGRAM CARRIER

Reinhold Bauder, 92 Mendelssohnstrasse, Stuttgart-Sillenbuch, Germany

Filed Dec. 16, 1958, Ser. No. 780,817

8 Claims. (Cl. 200—46)

For controlling a predetermined sequence of operations—e.g. in machine tools, production lines, advertising devices and the like—it is necessary to cause a program, i.e. a sequence of control commands, to be carried out once or repeatedly, it being mostly required to maintain each initiated command until the next command begins.

For such purposes, it has formerly been customary to use control mechanisms including a continuously or intermittently moved roller or the like provided with cams in a predetermined manner, said cams serving to operate contacts or the like.

Such known control mechanisms have the disadvantage of a limited operating accuracy, and for each new program it is necessary to change the mutual arrangement and possibly also the shape of the cams mounted on the control roller and of the contacts or the like operated thereby.

Due to these disadvantages, increasing use is made of record carriers in the form of tapes or cards, the commands being mechanically, optically, electrically or magnetically applied to a suitable record carrier from which they are then read. In such programming devices the record carriers may be easily replaced and also stored for later repeated use. Moreover, it is possible to obtain any desired accuracy of command control by using tapes of a suitable length.

On the other hand, such control devices have a number of disadvantages. E.g., in the command readout it is mostly required to amplify the command signal on its way from the tape to the sash gate if it is desired to control an intermediate relay or an amplifier output stage inserted in front of the sash gate. As for the maintenance of the commands there are used polarized relays or relays having hold circuits, the space requirements and costs of such a system are increased essentially. In addition, there is a higher trouble incidence and the necessity of an adequately complicated service.

All of the aforementioned disadvantages of known devices are eliminated by the present invention by transmitting the commands from a punched record carrier pneumatically or hydraulically using expansion joints to contact elements pulsed preferably by bistable control elements. Said contact elements may be loaded highly, so that electric amplifiers are rendered unnecessary. By suitable members such as magnets, springs or the like it is possible to hold these contact elements in the commanded position until a counter-command is received. That renders the use of relays unnecessary as the sash gates are capable of being controlled directly.

In accordance with the present invention, it is possible to compose a control arrangement for a plurality of command channels out of a corresponding number of command receivers by the building block principle.

The details of the invention are disclosed in the subsequent specification in connection with the drawing showing three different embodiments of a command emitter according to the present invention.

In the drawing

Figure 2:
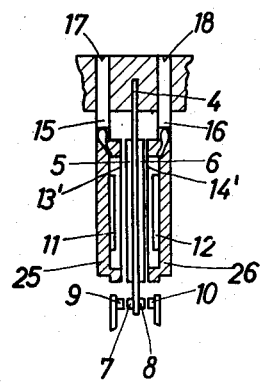
Figure 3:
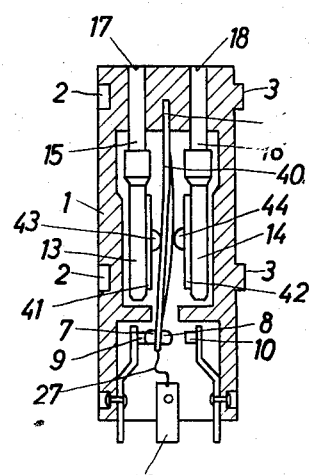
Figure 4:
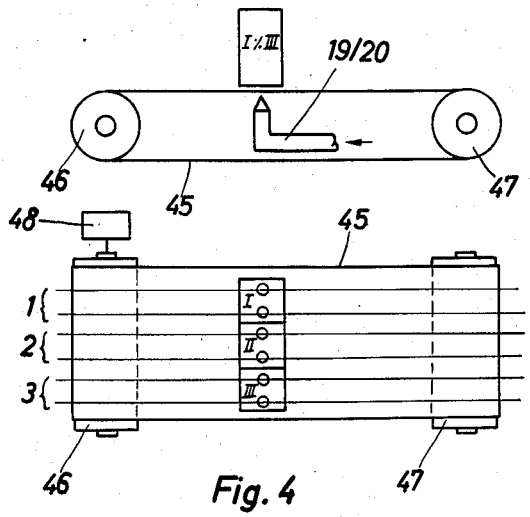

Fig. 1 shows a longitudinal section and a plan view of a command emitter according to this invention, Fig. 2 represents a longitudinal section and a plan view of another embodiment, Fig. 3 illustrates a longitudinal section of a third embodiment, and Fig. 4 shows a schematic side view and a plan view of a complete system including three command emitters composed by the building block principle.

The command emitter shown in Fig. 1 comprises a square housing 1 made e.g. of a plastic material the side walls of which are externally provided with corresponding recesses 2 and projections 3, so that it is possible to assemble a plurality of housings into one unit in the manner of building blocks.

Into the upper part of housing 1 there is die-cast or pressed the leaf spring 4 extending in the longitudinal direction of the housing and shown in its unstable central position, said leaf spring carrying on its free end, besides the contact plates 7 and 8 the plates 5 and 6 consisting of a ferromagnetic material. The free end of the spring 4 is conductively connected through the movable conductor 27 to the terminal plate 28.

Also die-cast or pressed into the housing 1 are the two permanent magnets 11 and 12 by which the spring 4 is rendered bistable in such a manner that in one limiting position its contact pin 7 abuts the counter-contact 9 whereas in its other limiting position its contact pin 8 abuts the counter-contact 10.

In the housing recess above the permanent magnets 11 and 12 on both sides of the spring 4 there is arranged one flat pocket 13 and 14, respectively, each consisting of a deformable material such as rubber, plastic, metal or the like, said pockets communicating with the small tubes 15 and 16, respectively, which in turn open into the channels 17 and 18, respectively, mounted in the housing cover.

Above the cannels 17 and 18 there is arranged one compressed-air nozzle each, 19 and 20, respectively. The program carrier 21 being in the form of a tape or card moves between said compressed-air nozzles and the surface 22 of the housing 1 serving as a sliding surface. If now—as indicated in Fig. 1—the flat pocket 13 is inflated the spring 4, which previously occupied its lefthand stable limiting positions, is torn away from the permanent magnet 11 and, due to the now effective attractive force of the permanent magnet 12, moved into its righthand stable limiting position, thus first opening the pair of contacts 7, 9 and thereafter closing the pair of contacts 8, 10.

In the upper surface 22 of the housing 1 which serves as a sliding surface there are contained the transversely extending grooves 23 and 24 which communicate with the channels 17 and 18, respectively, and through which the air issuing from one of the flat pockets 13, 14 may emerge on the outside. The deformation of the pockets 13 and 14 might also be effected by an externally produced negative pressure, in which case the housing channels 17 and 18 are normally closed by the program carrier 21 and momentarily opened only when one of the perforations contained therein registers with one of the channel openings. For equalizing the pressure between the inside and outside of the pockets, it is necessary that the latter be provided with holes presenting a substantially higher resistance to the air current than the channels 17 and 18, respectively. An air blast into these channels would momentarily deform the pockets and operate the contacts, but after a short time the air will have escaped and the pockets prepared for the receipt of a new command.

In the embodiment shown in Fig. 2 and having substantially smaller dimensions, there are provided on both sides of the spring 4 with the iron plates 5 and 6 the flat cups 25 and 26, respectively, which comprise a ferromagnetic material and on the bottom of which there is respectively arranged a flat permanent magnet 11 and 12, respectively, whereas over their backwardly facing edge there is stretched an elastic membrane each 13' and 14', respectively. The interior spaces of the cups 25 and 26, respectively, communicate through the small tubes 15 and 16, respectively, with the upwardly extending housing channels 17 and 18, respectively.

In the embodiment shown in Fig. 3, the flat leaf spring 4 in the housing 1 is replaced with a snap spring 40 which is rendered bistable by a central bulge and acted on by the projections 43 and 44, respectively, of the plates 41 and 42, respectively, mounted on the flat pockets 13 and 14, respectively.

Fig. 4 illustrates a complete system including three command emitter units, wherein the program carrier 45 has the form of an endless tape and runs over the rolls 46, 47 one of which is driven by the motor 48. In this example, the compressed-air nozzles are arranged in the space between the two drums of the program carrier 45.

The description of the arrangement of the invention in connection with the shown embodiment is not meant to represent a limitation to that embodiment. Thus, it is possible for instance to use as expansion bodies also pressure gauge ring springs or bellow membranes of a suitable material if necessary.

What is claimed as new and desired to be secured by Letters Patent is:

1. A command receiving device, comprising: a block having a cavity therein and a pair of spaced passages with openings at one side of the block, a pair of flat flexible pockets disposed in said cavity in alignment with the respective passages for receiving fluid under pressure therethrough directed selectively through one of the openings, a leaf spring secured at one end inside the block and extending into the cavity between said pockets, contact elements secured to opposite sides of said spring at the other end thereof, a pair of magnetic elements secured to said opposite sides of the spring near the contact elements, a pair of magnets disposed inside the block and spaced from opposite sides of the spring with one of said magnetic elements normally in contact with one of said magnets while the spring is flexed, and fixed electrical elements spaced from said other end of the spring at opposite sides thereof with one of the contact elements normally in contact with one of said electrical elements while the spring is flexed, whereby passage of said fluid under pressure through one of said passages causes expansion of one of the pockets to push said spring and break contacts between said one magnet and said one magnetic element and between said one contact element and said one electrical element, and whereby contacts are established between the other magnetic element and said magnet magnetically, and between the other contact element and said electrical element by flexure of said spring.

2. A command receiving device according to claim 1 further comprising a flexible electrical conducting means engaged with the other end of said leaf spring for establishing an electric circuit contacted contact and electrical elements.

3. A command receiving device according to claim 1, further comprising a flat program carrier having perforations therein located to register selectively with said openings, and means to move said carrier over said block on said one side thereof.

4. A command receiving device according to claim 3, further comprising nozzles respectively aligned with said openings for directing fluid under pressure therein.

5. A command receiving device according to claim 1, further comprising tubes secured in said passages, said pockets comprising flexible members secured to said tubes.

6. A command receiving device according to claim 1, wherein said magnets are seated in recesses in said block, and flexible diaphragms covering said magnets to separate mechanically said magnets from said magnetic elements.

7. A command receiving device, comprising: a block having a cavity therein and a pair of spaced passages with openings at one side of the block, a pair of flat flexible pockets disposed in said cavity in alignment with the respective passages for receiving fluid under pressure therethrough directed selectively through one of the openings, a leaf spring secured at one end inside the block and extending into the cavity between said pockets, contact elements secured to opposite sides of said spring at the other end thereof, and fixed electrical elements spaced from said other end of the spring at opposite sides thereof with one of the contact elements normally in contact with one of said electrical elements while the spring is flexed, whereby passage of said fluid under pressure through one of said passages causes expansion of one of the pockets to push said spring and break contact between said one contact element and said one electrical element and establish contact between the other contact element and the other electrical element due to flexure of said spring.

8. A command receiving device, comprising: a plurality of command units, each of said command units including a rectangular block, said blocks being disposed in side-by-side array to form a unitary command executing assembly, a program carrier comprising a flat perforated member movably disposed over one flat coplanar side of said blocks, each of said blocks having a pair of spaced passages therein with openings at said one side located to register with perforations in said member, each of the blocks having a cavity therein, a pair of flat flexible pockets disposed in said cavity in alignment with the respective passages for receiving fluid under pressure therethrough directed selectively through one of the openings and one of said perforations, a leaf spring secured at one end inside the block and extending into the cavity between said pockets, contact elements secured to opposite sides of said spring at the other end thereof, a pair of magnetic elements secured to said opposite sides of the spring near the contact elements, a pair of magnets disposed inside the block and spaced from opposite sides of the spring with one of said magnetic elements normally in contact with one of said magnets while the spring is flexed, and fixed electrical elements spaced from said other end of the spring at opposite sides thereof with one of the contact elements normally in contact with one of said electrical elements while the spring is flexed.

References Cited in the file of this patent

UNITED STATES PATENTS

| | | |
|---|---|---|
| 1,588,831 | Yokoyama | June 15, 1926 |
| 2,824,182 | Lambert | Feb. 18, 1958 |
| 2,849,580 | Tateishi | Aug. 26, 1958 |